June 11, 1929.　　W. H. ROWNEY　　1,717,264
CONTROL SYSTEM
Filed July 7, 1926
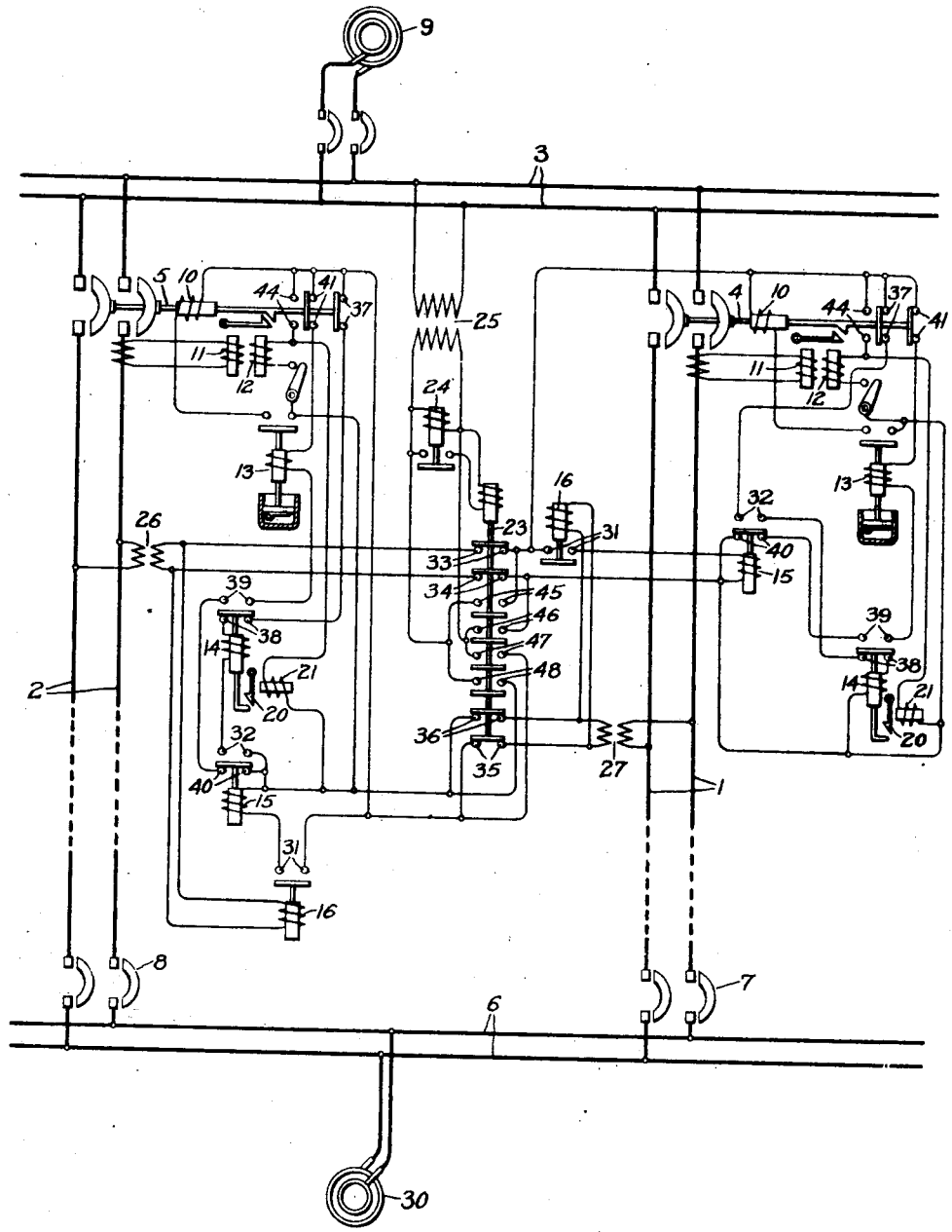
Inventor:
William H. Rowney,
by *Alexander S. Lui*
His Attorney.

Patented June 11, 1929.

1,717,264

UNITED STATES PATENT OFFICE.

WILLIAM H. ROWNEY, OF SCHENECTADY, NEW YORK, ASSIGNOR TO GENERAL ELECTRIC COMPANY, A CORPORATION OF NEW YORK.

CONTROL SYSTEM.

Application filed July 7, 1926. Serial No. 121,034.

My invention relates to remote control systems and particularly to systems for remotely controlling the closing of a circuit breaker in an electric circuit and one of its objects is to provide an improved arrangement for accomplishing this result without using pilot or other control wires between the controlling and controlled points.

Another object is to provide an arrangement whereby the closing of the circuit breaker may be controlled over the main circuit in which the circuit breaker is connected and the circuit breaker is closed at a time when the main circuit over which the circuit breaker is controlled is deenergized. Such an arrangement is very desirable when it is necessary to connect at the controlling point the main circuit to another circuit which is not in synchronism with the main circuit.

Another object of my invention is to provide an improved arrangement for controlling the circuit breaker over the main circuit whereby the operating condition of the line is checked before the circuit breaker is closed.

My invention will be better understood from the following description taken in connection with the accompanying drawing and its scope will be pointed out in the appended claims.

Referring to the accompanying drawing which shows an electric system embodying my invention, 1 and 2 represent two single phase electric power circuits, such as parallel feeders, which are adapted to be connected to a common bus 3 by suitable circuit breakers 4 and 5 respectively and to another common bus 6 by suitable circuit breakers 7 and 8 respectively. While I have shown my invention in connection with single phase circuits in order to simplify the disclosure, it is obvious that it is applicable to polyphase circuits and to direct current circuits. The buses 3 and 6 may be located at different points in the same station or they may be located in different stations. As shown the bus 3, which is adapted to be supplied from a suitable source 9, and the circuit breakers 4 and 5 are in an outlying station and the bus 6 and the circuit breakers 7 and 8 are in a controlling station, such as a dispatcher's office.

As shown in the drawing each of the circuit breakers 4 and 5 is arranged to be closed in response to the energization and the subsequent deenergization of its associated circuit at the controlling station when either the bus 3 or the other circuit is energized. Therefore these circuit breakers are arranged to be closed from the point where the circuit breakers 7 and 8 are located without the use of pilot wires or other auxiliary wires and only in case the respective circuits are in an operating condition.

For accomplishing this result each of the circuit breakers 4 and 5, which may be of any suitable type but which preferably are of the type known in the art as the latched-in type is provided with a closing coil 10, and a suitable overload trip coil 11 and voltage trip coil 12. Each closing coil 10 is controlled by a hesitating control relay 13 which in turn is controlled by two control relays 14 and 15. The relays 14 and 15 are controlled by a voltage relay 16 connected to the electric circuit which the respective breaker connects to the bus 3 at a point near its associated circuit breaker so that its energizing current flows through substantially all of the associated power circuit when the respective circuit breakers at the controlling station are closed. Therefore the relays 16 are energized only in case the respective circuits are in an operating condition. The relay 16, when energized, closes contacts in the circuit of its associated relay 15, and the relay 15 in turn closes contacts in the circuit of its associated relay 14. The relays 14 are designed in any suitable manner, examples of which are well known in the art, so that the contacts thereof that are closed when the relay coils are energized, remain closed after the relay coils are deenergized. As shown, the relays 14 are provided with latches 20 which hold the relays in their energized position and release coils 21 which, when energized, release the latches so that the relays can return to their deenergized position. The release coils 21 are controlled by their associated circuit breakers in a manner hereinafter described so that they are energized when the respective circuit breakers are closed.

The control devices, 10, 13, 14, 15 and 21 associated with each circuit breaker may be supplied from any suitable control source. As shown, however, they are arranged to be supplied from the bus 3 if it is energized and from the other parallel circuit if the bus 3 is not energized. For accomplishing this result a transfer relay 23 is provided which is controlled by a voltage relay 24 connected to the bus 3 by a suitable transformer 25. If the bus 3 is energized the relays 23 and 24 are energized and the relay 23 connects the various control devices 10, 13, 14, 15 and 21 associated with both circuit breakers 4 and 5 to the secondary of the transformer 25, the primary of which is connected across the bus 3. In case the bus 3 is not energized the relay 23 is deenergized so that it connects the control devices 10, 13, 14, 15 and 21 associated with the circuit breaker 4 to the secondary winding of a transformer 26, the primary of which is connected across the circuit 2, and the corresponding control devices associated with the circuit breaker 5 are connected across the secondary winding of a transformer 27 the primary of which is connected across the circuit 1.

The bus 6 is arranged to be supplied by a suitable source 30, and the circuit breakers 7 and 8 are arranged to be closed and opened in any suitable manner so as to connect the respective circuits 1 and 2 to the bus 6.

The operation of the system shown is as follows: It will be assumed first that all the circuit breakers are open and the source 9 is disconnected from the bus 3 and it is desired to close the circuit breakers 4 and 5. Circuit breakers 7 and 8 are both closed so that both of the circuits are energized by the source 30. It is immaterial which of the two breakers is closed first. The energization of the circuit 1 causes relay 16 associated therewith to close its contacts 31 in the circuit of the relay 15 associated with the circuit breaker 4 if the circuit 1 is in an operating condition. The relay 15, however, does not close its contacts 32 until the circuit 2 is energized because the circuit of this relay is connected across the secondary of the transformer 26 by the contcts 33 and 34 of the relay 23. Similarly the energization of the circuit 2 causes relay 16 associated therewith to close its contacts 31 in the circuit of the relay 15 associated with the circuit breaker 5 if the circuit 2 is in an operating condition. The relay 15 associated with circuit breaker 5, however, does not close its contacts 32 until the circuit 1 is energized since the circuit of this relay is connected by means of contacts 35 and 36 of the relay 23. It will be observed therefore that if there is an abnormal condition such as a short circuit connected across either circuit or the circuit is open the associated relay 16 does not pick up and close its contacts when the respective circuit is connected to the source 30, nor is the associated control transformer energized.

When both of the circuits 1 and 2 are energized and in an operating condition so that both of the relays 16 close their contacts 31, and both of the control transformers 26 and 27 are energized, both of the relays 15 close their contacts 32.

The closing of the contacts 32 of the relay 15 associated with the circuit breaker 4 completes a circuit for the coil of its associated relay 14 across the secondary of the transformer 26 through contacts 33 and 34 of the relay 23, auxiliary contacts 37 on the circuit breaker 4 and contacts 38 of the relay 14 itself.

The closing of the contacts of the relay 15 associated with the circuit breaker 5 completes a similar circuit for the coil of its associated relay 14 across the secondary of the transformer 27 through contacts 35 and 36 of the relay 23, auxiliary contacts 37 on the circuit breaker 5 and contacts 38 of the associated relay 14.

The two relays 14 when energized open their respective contacts 38 so that their energizing circuits are opened and close their respective contacts 39. The relays 14 are held in their energized positions by the latches 20.

After both of the circuits 1 and 2 have been simultaneously energized, the one which it is desired to connect to the bus 3 first is disconnected from the source 30. It will be assumed that circuit 1 is the first to be connected to the bus 3. Circuit breaker 7 therefore is opened and this effects the deenergization of the voltage relay 16 associated therewith which in turn effects the deenergization of its associated relay 15. This relay 15 by closing its contacts 40 completes a circuit for the coil of the hesitating control relay 13 associated with the circuit breaker 4 across the secondary of the transformer 26 through contacts 33 and 34 of the relay 23, auxiliary contacts 41 on the circuit breaker 4 and contacts 39 and 40 of the control relays 14 and 15 associated therewith. The relay 13 connects the closing coil 10 of the circuit breaker 4 directly across the secondary of the transformer 26 through contacts 33 and 34 of the relay 23. The circuit breaker 4 by closing its auxiliary contacts 44 connects the release coil 21 of the control relay 14 associated therewith across the secondary of the transformer 26 so that the relay is restored to its normal position. The opening of the auxiliary contacts 41 on the circuit breaker 4 deenergize the associated hesitating control relay 13 which after a predetermined time is restored to its deenergized position.

When the circuit breaker 7 is opened to effect the closing of the circuit breaker 4 the relay 15 associated with the circuit breaker 5 is deenergized so that it closes its contacts 40 and thereby completes the circuit of the coil of the hesitating relay 13 associated with the circuit breaker 5 across the secondary of the transformer 27. Since the circuit is deenergized the hesitating control relay 13 is not energized and therefore does not operate to complete the circuit of the closing coil 10 of the circuit breaker 5.

After the circuit breaker 4 has been closed the circuit breaker 8 is then opened so as to disconnect the source 30 from the line 2 so that its associated voltage relay 16 is deenergized. The deenergization of this relay 16 at this time only opens the circuit of its associated relay 15 which is already deenergized because line 1 is deenergized.

The circuit breaker 7 is then closed to connect the two buses 3 and 6 together through the line 1 and to effect the closing of the circuit breaker 5 in the line 2. When the line 1 is energized the second time the relay 13 associated with the circuit breaker 5 is energized from the secondary of the transformer 27 through contacts 35 and 36 of the relay 23, auxiliary contacts 41 on the circuit breaker 5, and contacts 39 and 40 of the associated relays 14 and 15. The relay 13 completes the circuit of the closing coil 10 of the circuit breaker 5 across the secondary of the transformer 27 so that the circuit breaker closes. The circuit breaker 8 is then closed so that current flows from one bus to the other through both of the circuits 1 and 2 in parallel.

In case the bus 3 is energized by the source 9 when it is desired to close either of the circuit breakers 4 and 5 it is only necessary to close and open the circuit breaker at the other end of the respective circuit since the control devices 10, 13, 14 and 15 of the respective circuit breakers receive their current under these conditions from the bus 3 which is energized.

It will be observed that when the relay 23 is energized, its contacts 33 and 34 are opened and its contacts 45 and 46 are closed so that the control devices associated with circuit breaker 4 receive their control current from the transformer 25 instead of the transformer 26 connected to the line 2. Also its contacts 35 and 36 are opened and its contacts 47 and 48 are closed so that the control devices associated with the circuit breaker 5 receive their control current from the transformer 25 instead of the transformer 27 connected to the line 2. Therefore it will be evident that when either the circuit breaker 4 or 5 is open it may be closed by first closing the circuit breaker at the other end of the respective circuit which cause its associated relays 14 and 15 to pick up if the circuit is in an operating condition, and then opening the circuit breaker at the other end of the circuit which allows the associated relay 15 to become deenergized and thereby effect the completion of the circuits of the hesitating control relay 13 and the closing coil 10 of the particular breaker in question.

It will be observed that the circuit breakers 4 and 5 may be closed only when the circuit breakers at the other end of the respective circuits are open. This arrangement therefore is of particular utility where it is desirable to connect together two systems which are not in synchronism.

While I have in accordance with the patent statutes shown and described my invention as applied to a particular system and as embodying various devices diagrammatically indicated, changes and modifications will be obvious to those skilled in the art and I therefore aim in the appended claims to cover all such modifications and changes as fall within the true spirit and scope of my invention.

What I claim as new and desire to secure by Letters Patent of the United States is:—

1. In combination, an energized electric circuit, a deenergized electric circuit, a circuit breaker for connecting said circuits together, electroresponsive means arranged when energized to effect the closing of said circuit breaker, a circuit for said electroresponsive means, contacts in the circuit of said electroresponsive means, means responsive to the voltage across said deenergized circuit for closing certain of said contacts, and means responsive to the subsequent deenergization of said deenergized circuit for closing other of said contacts.

2. In combination, two electric circuits, a circuit breaker for connecting said circuits together, electroresponsive means arranged when energized to effect the closing of said circuit breaker, a circuit for said electroresponsive means, contacts in said last mentioned circuit, means responsive to the voltage across one of said circuits for closing certain of said contacts and means for closing other of said contacts when said one of said circuits is subsequently deenergized.

3. In combination, two electric circuits, a circuit breaker for connecting said circuits together, electroresponsive means arranged when energized to effect the closing of said circuit breaker, a circuit for said electroresponsive means, contacts in said last mentioned circuit, means responsive to the voltage across one of said circuits for closing said contacts in response to the energization of said one of said circuits, means for maintaining said contacts closed after a subsequent deenergization of said one of said circuits, means for effecting the energization and deenergization of said one of said circuits, other contacts in the circuit of said electroresponsive means, and means for closing said last mentioned contacts when said one of said circuits is deenergized.

4. In combination, two electric circuits, a circuit breaker for connecting said circuits together, electroresponsive means arranged when energized to effect the closing of said circuit breaker, a circuit for said electroresponsive means, contacts in said last mentioned circuit, means for closing said contacts in response to the energization of one of said circuits, means for maintaining said contacts closed, other contacts in the circuit of said electroresponsive means, means for closing said last-mentioned contacts when said one of said circuits is deenergized, means for effecting the energization and deenergization of said one of said electric circuits and releasing means responsive to the closing of said circuit breaker for restoring said first mentioned contacts to their normal position.

5. In combination, two electric circuits, a common bus, a circuit breaker in each circuit for connecting it to said common bus, and means responsive to the energization of either one of said circuits and the energization and subsequent deenergization of the other of said circuits for closing the circuit breaker in said other of said circuits.

6. In combination, two electric circuits, a common bus, a circuit breaker in each circuit for connecting it to said common bus, electroresponsive means associated with each circuit breaker for effecting the closing thereof, and means responsive to the energization and subsequent deenergization of each electric circuit for effecting the connection of the associated electroresponsive means across the other electric circuit.

7. In combination, two electric circuits, a common bus, a circuit breaker in each circuit for connecting it to said common bus, and means for closing each circuit breaker in response to the energization and subsequent deenergization of the electric circuit which the circuit breaker connects to the bus when either the bus or the other electric circuit is energized.

8. In combination, two electric circuits, a common bus, a circuit breaker in each circuit for connecting it to said common bus, electroresponsive means associated with each circuit breaker for effecting the closing thereof, a circuit for each electroresponsive means, means for completing the circuit for each electroresponsive means in response to the energization and subsequent deenergization of the electric circuit with whose circuit breaker it is associated, and means for energizing the circuits of said electroresponsive means from said bus when it is energized and from the circuit with whose circuit breaker the respective electroresponsive means is not associated when said bus is not energized.

9. In combination, a power circuit, a circuit breaker at one end of said circuit, a source of current, means for connecting said source to and disconnecting said source from the other end of said circuit, electroresponsive means arranged when energized to effect the closing of said circuit breaker, a circuit for said electroresponsive means, a voltage responsive device connected to said power circuit near said circuit breaker whereby the energizing current for said device flows through substantially all of said power circuit when said source is connected thereto, contacts in the circuit of said electroresponsive means controlled by said voltage responsive device so as to be closed when said voltage responsive device is not energized, other contacts in the circuit of said electroresponsive means controlled by said voltage responsive device so as to be closed when said voltage responsive device is energized, and means for maintaining said last mentioned contacts closed after said voltage responsive device has been deenergized.

10. In combination, two electric circuits, one of which is energized, a third circuit for connecting said two electric circuits together, a circuit breaker for connecting one end of said third circuit to the electric circuit which is energized, another circuit breaker for connecting the other end of said third circuit to the other of said electric circuits, an electroresponsive device associated with said last mentioned circuit breaker and connected to said third circuit so as to be energized through said third circuit when said first mentioned circuit breaker is closed, and means controlled by said electroresponsive device for effecting the closing of said last mentioned circuit breaker in response to the energization and subsequent deenergization of said electroresponsive device.

11. In combination, two buses, one of which is energized, two circuits for connecting said buses together, a circuit breaker associated with each circuit for connecting one end thereof to the energized bus, a circuit breaker at the other end of one of said circuits for connecting it to the other bus, an electroresponsive device associated with said last mentioned circuit breaker and connected so as to be energized through the circuit with which it is associated when it is connected to the energized bus, and means controlled by said electroresponsive device and arranged to be energized from the other circuit for effecting the closing of said last mentioned circuit breaker in response to the energization and subsequent deenergization of said electroresponsive device.

In witness whereof, I have hereunto set my hand this 3d day of July, 1926.

WILLIAM H. ROWNEY.